Nov. 10, 1936.  E. T. BRACE  2,060,411
METHOD OF INCUBATION
Filed April 15, 1932  4 Sheets-Sheet 1
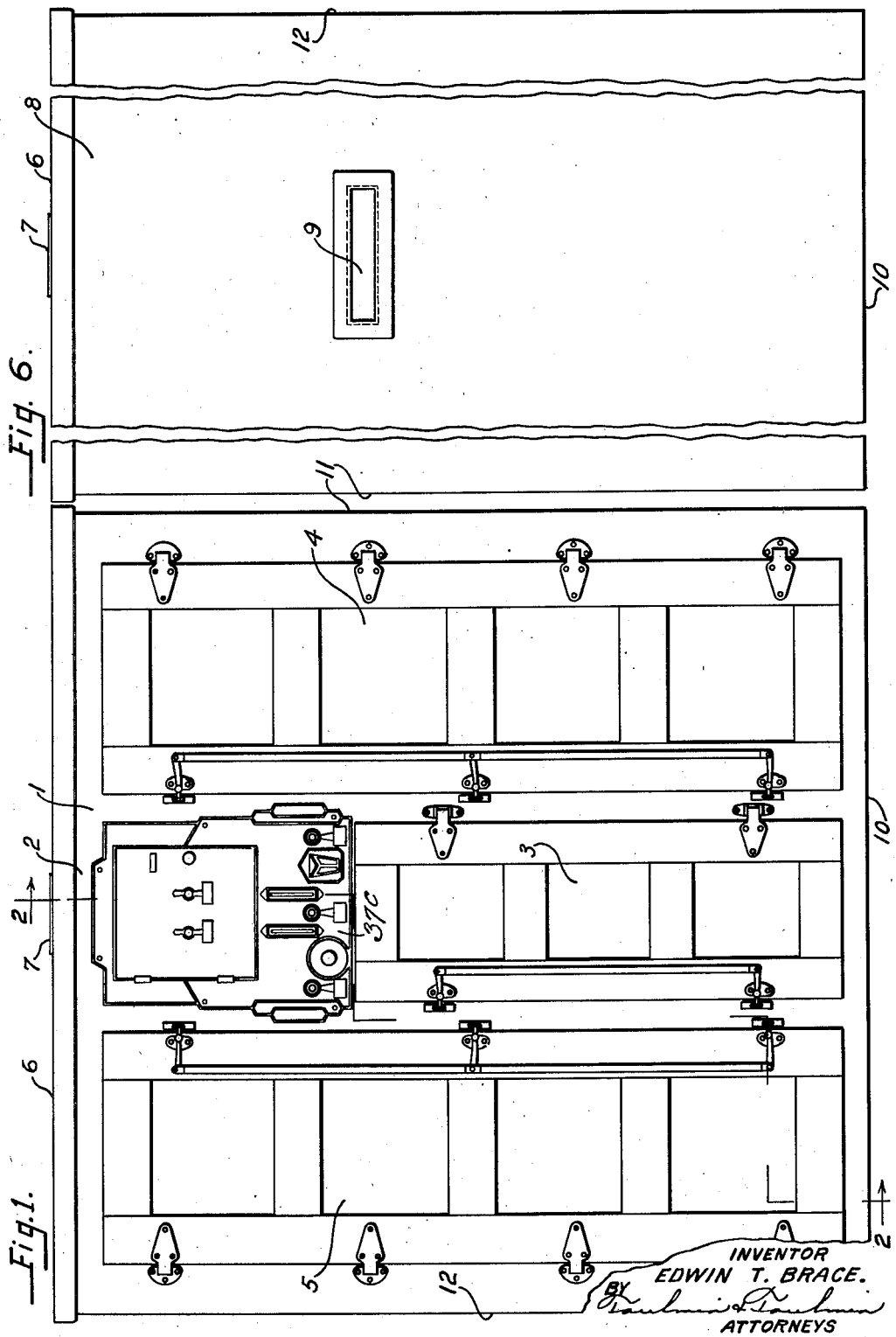
INVENTOR
EDWIN T. BRACE.
BY
ATTORNEYS

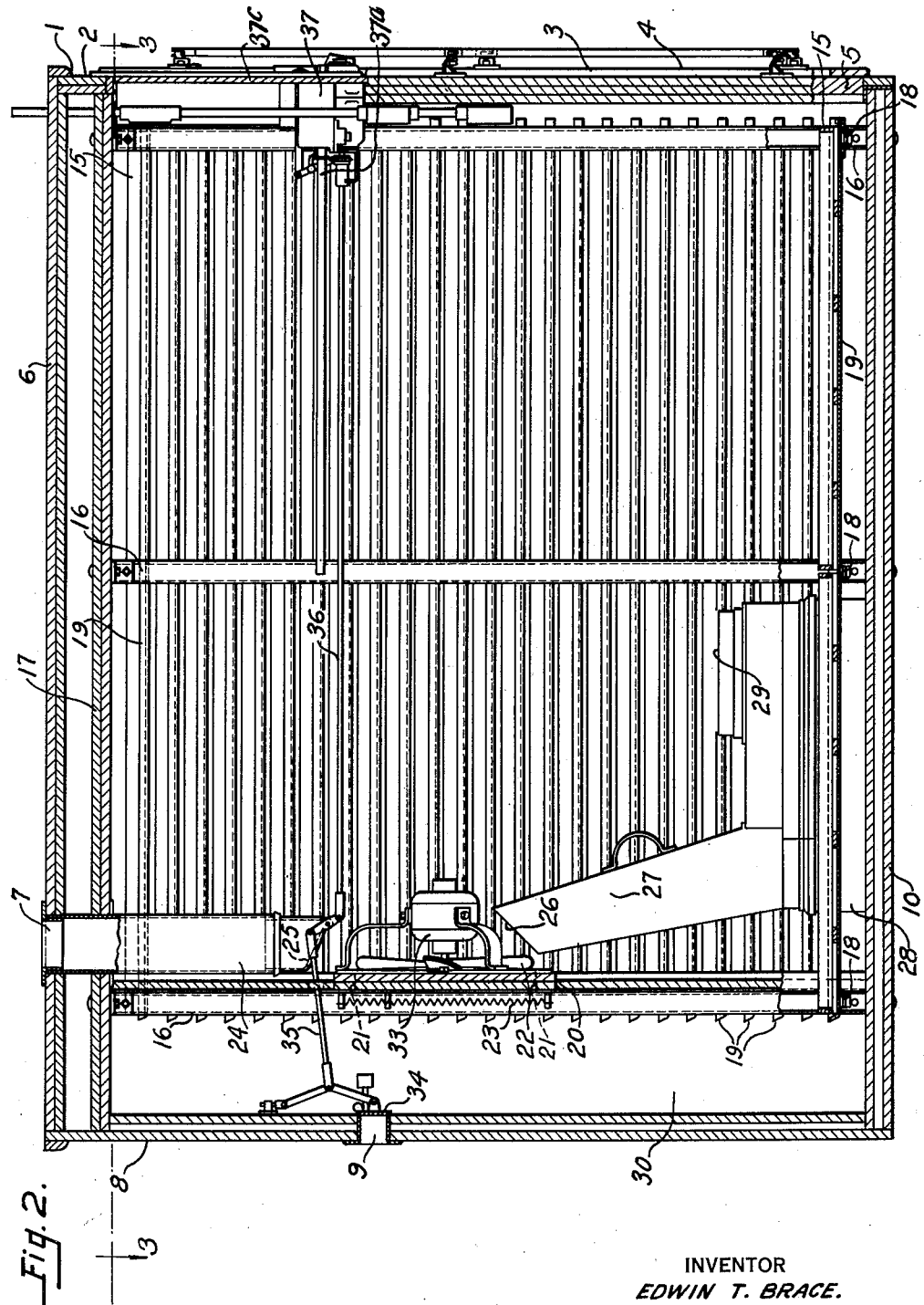

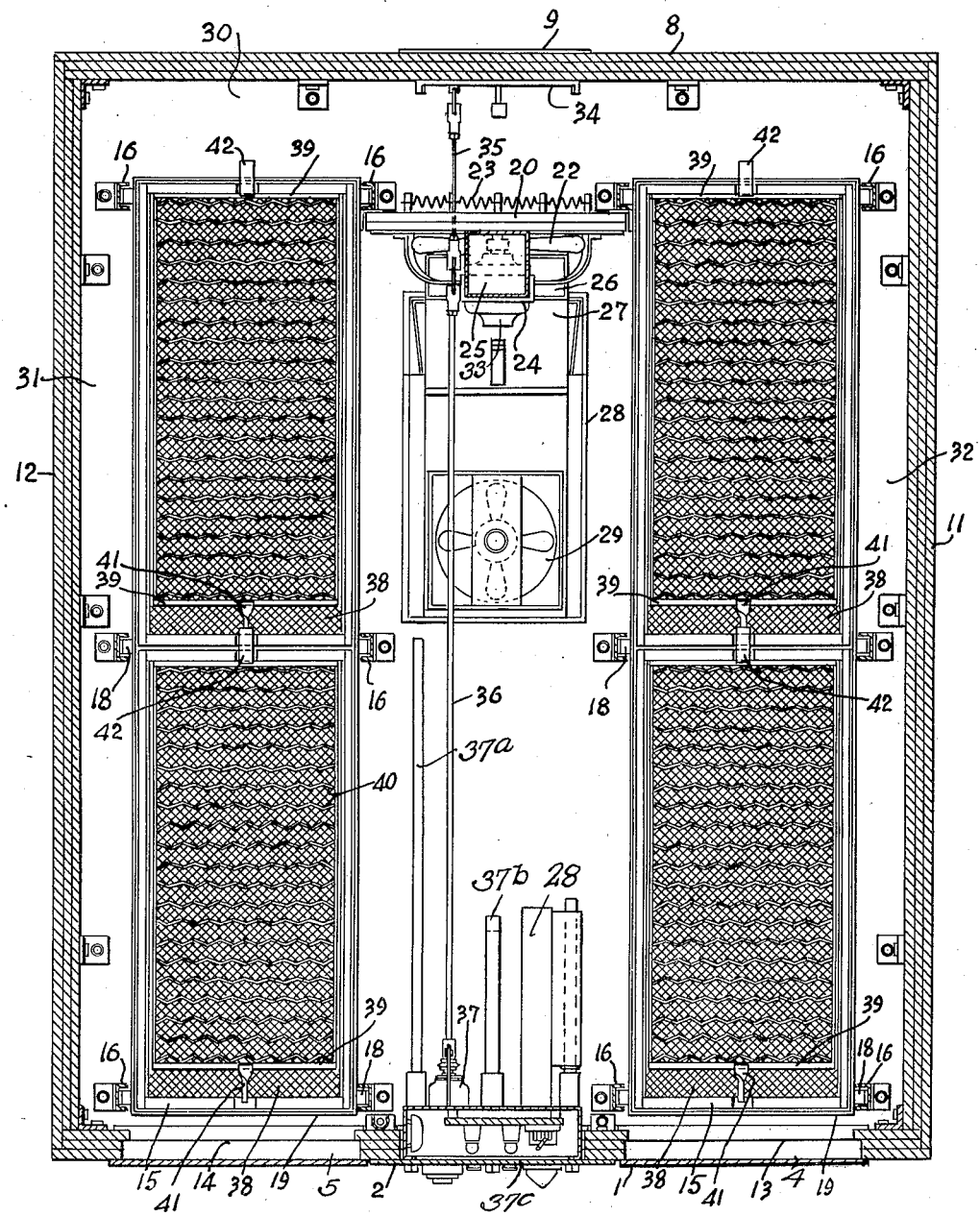

Nov. 10, 1936.    E. T. BRACE    2,060,411
METHOD OF INCUBATION
Filed April 15, 1932    4 Sheets-Sheet 4
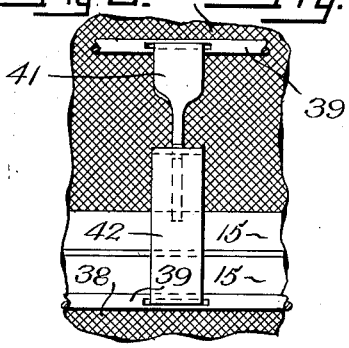
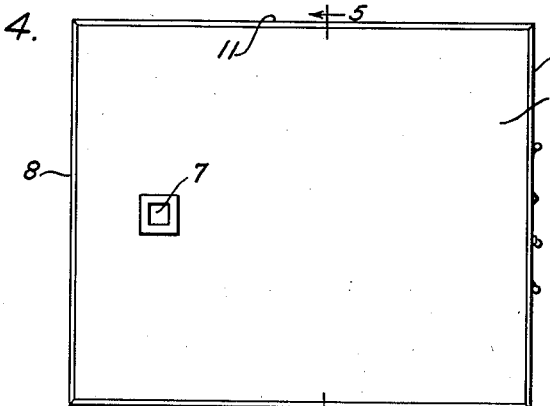
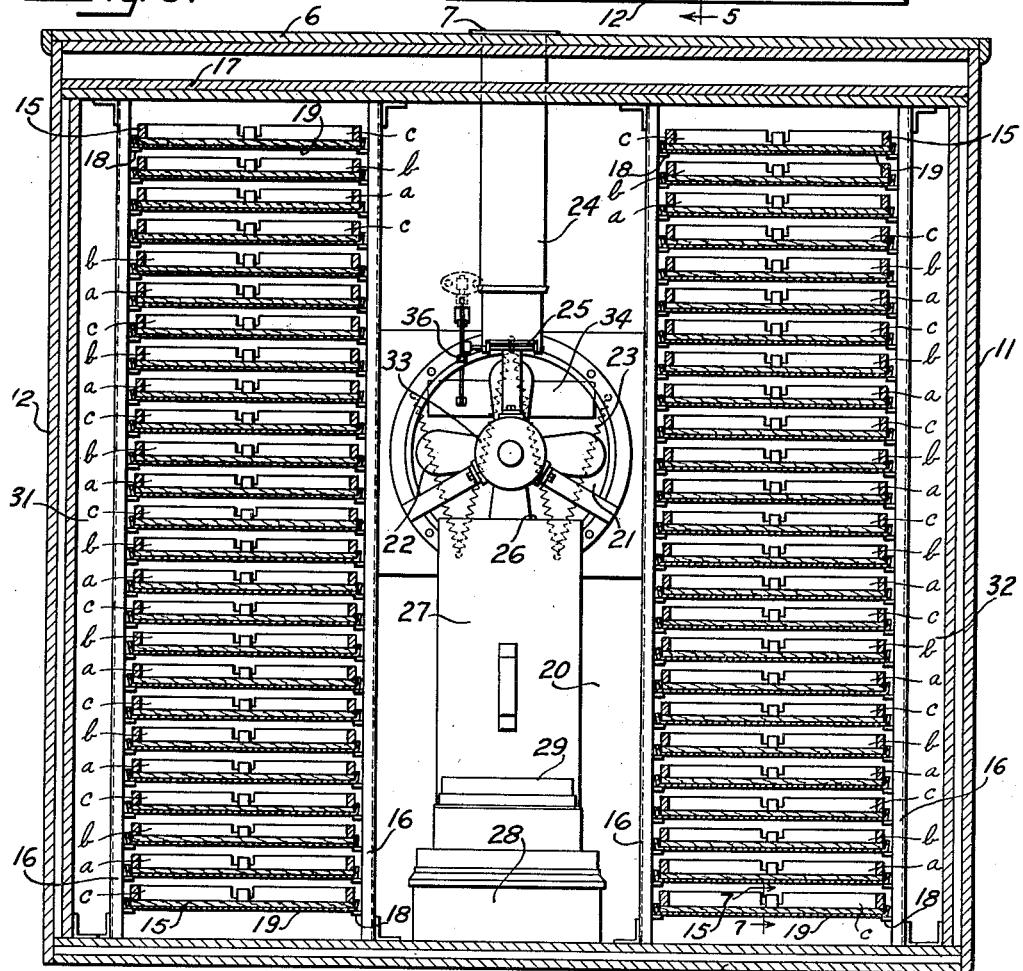
INVENTOR
EDWIN T. BRACE.
BY
ATTORNEY Patented Nov. 10, 1936

2,060,411

UNITED STATES PATENT OFFICE 2,060,411

METHOD OF INCUBATION

Edwin T. Brace, Springfield, Ohio, assignor to The Buckeye Incubator Manufacturing Company, Springfield, Ohio, a corporation of Ohio Application April 15, 1932, Serial No. 605,406

10 Claims. (Cl. 119—37)

My invention relates to incubation and, in particular, to the incubation of poultry.

It is the object of my invention to provide a method of incubation which includes the step of circulating air in horizontal planes between stacks of egg trays and between the egg trays in the stacks.

It is a further object to provide in incubation the steps of admitting fresh air and of expelling foul air from an incubator.

It is a further object to provide for the heating of the circulating air at the point where it is admitted so as to provide accurate control of the temperature and moisture conditions within the incubator.

It is a further object to provide for circulating air in such a manner as to effectively moisten the air when and as desired.

It is a further object to provide for arranging and stacking the egg trays so as to be able to withdraw a plurality of trays in the same horizontal plane simultaneously from one side of the incubator.

Referring to the drawings:

Figure 1 is a front elevation of the incubator;

Figure 2 is a section on the line 2—2 of Figure 1;

Figure 3 is a section on the line 3—3 of Figure 2;

Figure 4 is a top plan view of the incubator;

Figure 5 is a section on the line 5—5 of Figure 4;

Figure 6 is a rear elevation of the incubator; and

Figure 7 is a section on the line 7—7 of Figure 5;

Figure 8 is a top plan view of Figure 7.

Referring to the drawings in detail, I designates the front of the incubator having a central panel 2, a central door 3, a right hand door 4 and a left hand door 5. 6 designates the top of the incubator which has an air inlet opening 7. 8 indicates the back of the incubator having an air exit opening 9. 10 designates the bottom of the incubator. 11 designates the right hand side and 12 the left hand side.

The front wall 1 is provided with doors 4 and 5 which, when open, uncover door ways 13 and 14 of sufficient size for the withdrawal of the trays 15. The exact construction of the trays and the egg-turning means in the trays will be hereinafter described.

A plurality of spaced, upright channels 16 extend from the bottom 10 to the false top 17. These uprights carry tray-supporting members 18 which carry, in turn, solid bottom trays 19 on which are mounted the egg trays 15. The trays are arranged in parallel spaced stacks of any desired width between them. In this space at one end of the space is mounted a vertically disposed fan supporting plate 20 having a fan aperture 21 and a fan 22 mounted therein, over the face of which fan are the heating elements 23. Directly over the fan is an intake pipe 24 having a closing damper 25. This pipe extends from the top opening 7 to the top of the intake side of the fan, the fan being located about halfway between the top and bottom of the incubator. The outlet of the humidifier is also located at 26, at which point the humidifier discharge chute 27 terminates. The humidifier proper is at 28.

Air enters the humidifier through the port 29, is humidified therein and the humidified air then is discharged through the chute 27 into the air stream of the fan 22 in a direction approximately perpendicular to that air stream, as is evident from Figure 2.

The humidifier per se is covered in my co-pending application, Serial No. 605,476, filed April 15, 1932, which has now become Patent No. 2,002,880, issued May 28, 1935.

In this construction the eggs are set in a staggered arrangement so that the coolest eggs are always below the hottest eggs. The youngest or coolest eggs are always below the most advanced eggs. For instance, at first the eggs are set in the first group in those trays marked *c*. The next group of eggs are set at a later date in the trays marked *b*, and the third group of eggs are set in the trays marked *a*. At the proper stage of incubation the trays marked *c* are removed and the trays marked *b* and *a* are moved up. The lowest tray marked *c* is not moved through the whole period of incubation. The arrangement of the trays in groups in which the eggs are arranged according to their condition of incubation causes a balance in the temperature conditions in the incubator casing. When an eighteen-day cycle is employed where this machine is used only as an incubator and not as a hatcher, three group settings will be sufficient. It will be noted that as the eggs mature and are raised to upper tray supporting members and fresh groups are inserted the coolest eggs are always below the hottest eggs in every group of three trays.

At the end of the 18th day, the "c" eggs are removed. No eggs are put in their place until three days have elapsed.

The fan at 22 is driven by an electric motor 33. The exhaust opening from the passageway 30 is controlled by the damper 34 and the inlet is controlled by the damper 25, such dampers being connected together by the link mechanism generally designated 35. These dampers are operated by a common control rod 36 from a thermostatic control 37. The thermostats 37a and 37b on a panel 37c may be used for controlling the air circulation and the heat. The exact details of the damper operation and control to control the heat and to control the humidity are more fully set forth in my copending applications, Serial No. 610,728, filed May 11, 1932, and Serial No. 639,455, filed October 25, 1932, said application No. 639,455 having become Patent No. 2,020,133, issued Nov. 5, 1935.

The present application is directed to covering the physical arrangement and method of moving the air and of setting the eggs in connection with moving the air.

Tray construction

The wire bottoms of the trays 38 support an internal frame 39 of lesser length than the tray 15 and adapted to reciprocate within the tray 15. The bottom of this open frame 39 carries a plurality of spaced transverse egg turning wires or bars 40 which upon reciprocation of the frame 39, will rock the eggs upon the wire bottom 38 of the tray 15 and will thus turn the eggs.

In order to provide means of actuating this reciprocating egg-turning rack in the rear stack of trays, I provide at the end of one rack a hook 41 which engages with a cross over link 42 that crosses over from one tray to the other thereby connecting the two reciprocating egg turning racks 39 together so that the actuation of one of them at one end will actuate both of them and turn the eggs in both trays.

This connection of the hook 41 and the cross over link 42 also serves to connect two trays together so that they will slide inwardly and outwardly together as a unit upon the closed bottom 19.

It will be noted that this frame 39 carries the egg-shifting members 40 above the screen 38 on which the eggs rest.

It is thus possible to use the egg-shifting frame both as an egg-shifter and as a means of withdrawing the fore and aft trays with their multiple stacks of trays one behind the other.

Having thus fully described my invention, what I claim as new and desire to secure by Letters Patent, is:

1. In a method of incubating eggs, arranging eggs in stacks of trays and enclosing the eggs in an enclosure, circulating air in horizontal streams about the stacks and between the trays of eggs in separate streams by separating the air into streams adjacent the eggs, mixing the streams between two adjacent stacks and again delivering the air in separated streams between the egg trays.

2. In a method of incubating eggs, arranging eggs in stacks of trays and enclosing the eggs in an enclosure, circulating air in horizontal streams about the stacks and between the trays of eggs in separate streams by separating the air into streams adjacent the eggs, mixing the streams between two adjacent stacks and again delivering the air in separated streams between the egg trays and introducing fresh air at the point of mixing.

3. In a method of incubating eggs, arranging eggs in stacks of trays and enclosing the eggs in an enclosure, circulating air in horizontal streams about the stacks and between the trays of eggs in separate streams by separating the air into streams adjacent the eggs, mixing the streams between two adjacent stacks and again delivering the air in separated streams between the egg trays, introducing fresh air at the point of mixing, and discharging foul air substantially at the point of mixing.

4. In a method of incubating eggs, arranging eggs in stacks of trays and enclosing the eggs in an enclosure, circulating air in horizontal streams about the stacks and between the trays of eggs in separate streams by separating the air into streams adjacent the eggs, mixing the streams between two adjacent stacks and again delivering the air in separated streams between the egg trays, introducing fresh air at the point of mixing, discharging foul air substantially at the point of mixing, and introducing humidified air substantially at the point of mixing.

5. In a method of incubating eggs, arranging eggs in stacks of trays and enclosing the eggs in an enclosure, circulating air in horizontal streams about the stacks and between the trays of eggs in separate streams by separating the air into streams adjacent to the eggs, mixing the streams between two adjacent stacks, again delivering the air in separated streams between the egg trays, introducing fresh air at the point of mixing, and introducing humidified air at the point of mixing.

6. In a method of incubating eggs, arranging eggs in stacks of trays and enclosing the eggs in an enclosure, circulating air in horizontal streams about the stacks and between the trays of eggs in separate streams by separating the air into streams adjacent to the eggs, mixing the streams between two adjacent stacks, again delivering the air in separated streams between the egg trays, introducing fresh air at the point of mixing, and introducing humidified air at the point of mixing, the fresh air and the humidified air being caused to move oppositely in streams so as to encounter one another and intermingle.

7. In a method of incubating eggs, arranging eggs in stacks of trays and enclosing the eggs in an enclosure, circulating air in horizontal streams about the stacks and between the trays of eggs in separate streams by separating the air into streams adjacent to the eggs, mixing the streams between two adjacent stacks, again delivering the air in separated streams between the egg trays, introducing fresh air at the point of mixing, withdrawing a portion of the air prior to the point of mixing, humidifying the withdrawn air, and reintroducing the humidified air at the point of mixing, the fresh air and the humidified air being caused to move oppositely in streams so as to encounter one another and intermingle and also to intermingle with the streams returning from the stacks at a common mixing point.

8. In a method of incubating eggs, arranging eggs in stacks of trays and enclosing the eggs in an enclosure, circulating air in horizontal streams about the stacks and between the trays of eggs in separate streams by separating the air into streams adjacent to the eggs, mixing the streams between two adjacent stacks, again delivering the air in separated streams between the egg trays, introducing fresh air at the point of mixing, introducing humidified air at the point of mixing, and discharging foul air substantially at the point of mixing.

9. In a method of incubating eggs, arranging eggs in stacks of trays and enclosing the eggs in an enclosure, circulating air in horizontal streams about the stacks and between the trays of eggs in separate streams by separating the air into streams adjacent to the eggs, mixing the streams between two adjacent stacks, again delivering the air in separated streams between the egg trays, introducing fresh air at the point of mixing, introducing humidified air at the point of mixing, the fresh air and the humidified air being caused to move oppositely in streams so as to encounter one another and intermingle, and discharging foul air substantially at the point of mixing.

10. In a method of incubating eggs, arranging eggs in stacks of trays and enclosing the eggs in an enclosure, circulating air in horizontal streams about the stacks and between the trays of eggs in separate streams by separating the air into streams adjacent to the eggs, mixing the streams between two adjacent stacks, again delivering the air in separated streams between the egg trays, humidifying a portion of the air which has passed between the egg trays, and re-introducing the humidified air at the point of mixing.

EDWIN T. BRACE.